3,023,089
Patented Feb. 27, 1962

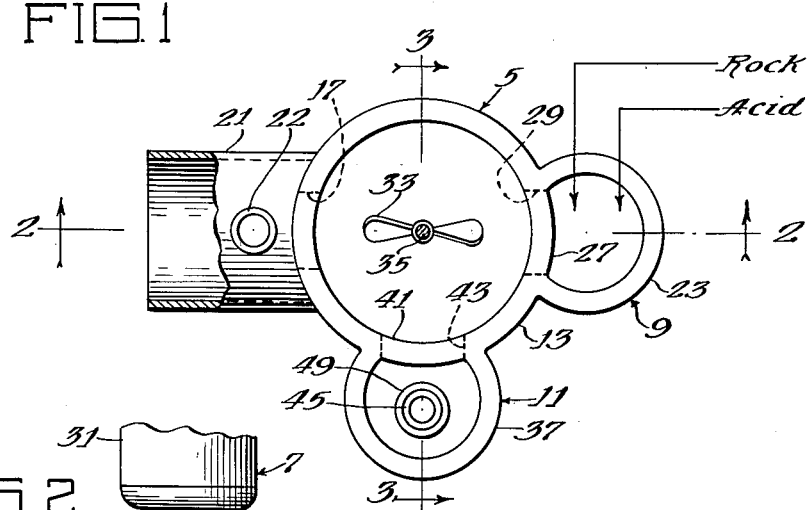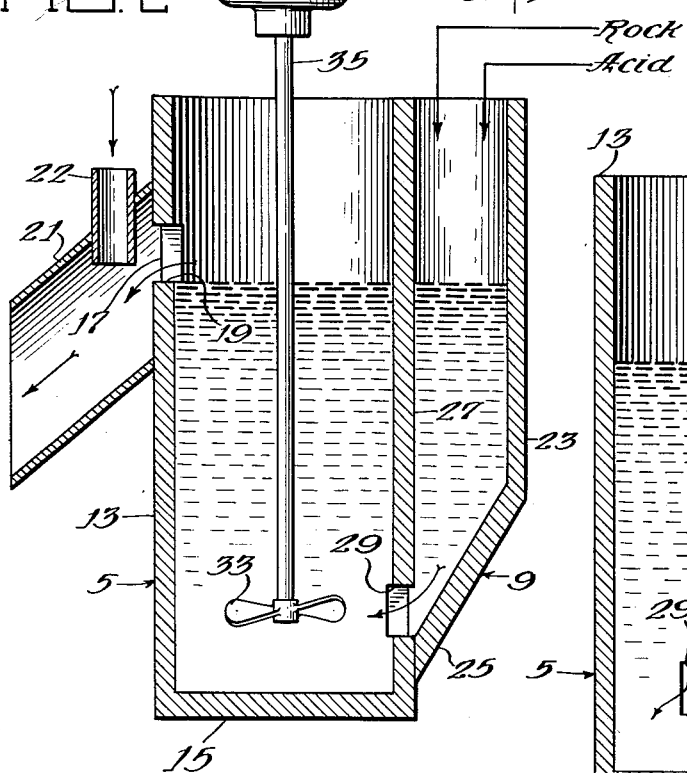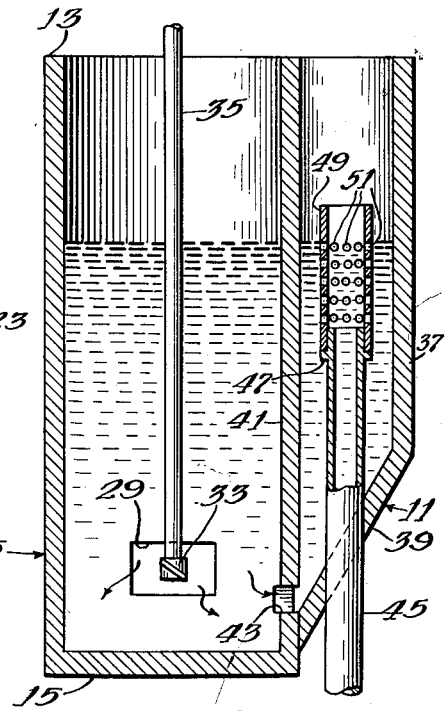

3,023,089
REACTION VESSEL
Howard B. Graves, Jr., Lakeland, and Benjamin P. Bell, Mulberry, Fla., assignors to International Minerals & Chemical Corporation, a corporation of New York
Filed July 28, 1958, Ser. No. 751,522
2 Claims. (Cl. 23—259.2)

The present invention generally relates to an apparatus for contacting solid particles with a liquid. More particularly, the invention relates to a novel reaction vessel into which solid particles and a liquid may be continuously introduced and from which solid particles and a liquid substantially free of solid particles may be continuously and separately withdrawn.

Solid particles are often contacted with a liquid so as to effect chemical reaction, leaching, heat exchange, etc. Solid particles may be contacted with a liquid on a batch basis; however, it usually is preferred to effect operations on a continuous basis. Further, when solid particles remain in the solution after the desired treatment of solid particles with a liquid is effected, it is often desirable or necessary to separate liquid from the solids.

It is accordingly an object of the present invention to provide an apparatus for contacting solid particles with a liquid.

It is another object of the invention to provide a novel reaction vessel into which solid particles and a liquid may be continuously introduced.

It is a further object of the invention to provide a novel reaction vessel into which solid particles and a liquid may be continuously introduced and from which solid particles and a liquid substantially free of solid particles may be continuously and separately withdrawn.

It is a specific object of this invention to provide a novel reaction vessel into which a mineral acid and phosphate rock may be continuously introduced so as to effect reaction between the phosphate rock and the mineral acid, and from which remaining solid particles and an acidic solution containing phosphoric acid may be continuously and separately withdrawn.

Further objects and advantages of the present invention will be apparent from the following description and accompanying drawing which illustrates one form of the invention.

In the drawing:

FIGURE 1 is a plan view of a reaction vessel embodying various of the features of this invention;

FIGURE 2 is a cross sectional view taken along line 2—2 of FIGURE 1; and

FIGURE 3 is a cross sectional view taken along line 3—3 of FIGURE 1.

The present invention provides an apparatus for contacting solid particles with a liquid in a manner such that the solid particles and liquid may be continuously introduced into the apparatus. The apparatus of the present invention also provides a unique manner of separately withdrawing solid particles and liquid substantially free of solid particles.

The apparatus of the present invention provides a main reaction vessel adapted to hold a liquid, with an outlet opening in an upper portion of the main reaction vessel through which solid particles may pass. A preliminary mixing chamber is also provided. The preliminary mixing chamber is adapted to hold liquid and is provided with an inlet opening in an upper portion through which solid particles and liquid may be introduced into the preliminary mixing chamber. The preliminary mixing chamber has an outlet opening in a lower portion thereof and the main reaction vessel has an inlet opening in the lower portion thereof. A means is provided to connect these openings so that liquid and solid particles may pass from the lower portion of the preliminary mixing chamber into a lower portion of the main reaction vessel.

The apparatus also provides a settling chamber having an outlet opening in an upper portion thereof through which a liquid substantially free of solid particles may pass. The settling chamber also has an inlet opening in a lower portion thereof and the main reaction vessel has an outlet opening in a lower portion thereof. Means is provided to connect these openings so that solid particles and liquid may pass from a lower portion of the main reaction vessel into a lower portion of the settling chamber. In the settling chamber substantially quiescent conditions are maintained so that the solid particles settle toward the bottom of the settling chamber. The means connecting the opening in the lower portion of the main reaction vessel with the opening in the lower portion of the settling chamber also permits settled solids to return from the settling chamber to the main reaction vessel.

An embodiment of the present invention is shown in the drawing and is described in the following paragraphs. While the apparatus shown in the drawing is specifically adapted for the continuous contact of finely divided phosphatic material with a mineral acid, it will be understood that the apparatus may be used for the contacting of other solid particles with other liquids with equal facility.

As will hereinafter become apparent, the apparatus shown in the drawing includes, generally, a main reaction vessel 5, a means 7 for providing agitation within the main reaction vessel, a preliminary mixing chamber 9 and a settling chamber 11. The main reaction vessel 5 is in fluid communication with two separate chambers, 9 and 11. The chamber 9 and the chamber 11 are separate from each other and are separate from and exterior to the main reaction vessel 5.

Referring now particularly to the drawing, the specific apparatus illustrated embodies various features of the invention. The illustrated apparatus includes the main reaction vessel 5 which is a substantially vertical cylindrical vessel 13 having a bottom closing member 15. The reaction vessel 5, as well as the preliminary mixing chamber 9, and the settling chamber 11 are fabricated from suitable water impervious material which, preferably, is resistant to corrosion from any of the solids or liquids with which they may be in contact. For small size structures, glass is a desirable material to use. While a cylindrical vessel is preferred for the main reaction vessel, a vessel of the other cross section may be used.

The cylindrical vessel 13 has an opening 17 in an upper portion thereof through which solid particles and liquid may pass out of the vessel. The opening 17 preferably has a substantially horizontal lower edge 19 positioned at the desired level of liquid in the vessel 13. A tube or conduit 21 is placed over the opening 17 to conduct material passing through the opening 17 downwardly, as shown by the direction arrows in FIGURE 3, to a suitable disposal point. The material passing through opening 17 includes solids which tend to collect in the tube 21. In order to keep the tube 21 clear, a short section of tubing 22 is provided in the wall of the tube 21 near where it connects with the cylinder 13, and water is passed through the tubing 22 into the tube 21 to thereby wash down any collected solids. To provide agitation in the main reaction vessel the means 7 is provided which includes an electric motor 31, an impeller 33, and a connecting shaft 35.

The preliminary mixing chamber 9 is a section of a substantially vertical cylinder 23 which is suitably attached to the cylindrical vessel 13. The bottom of the cylindrical section 23 is closed with an inclined flat plate 25 which is sloped downwardly toward the cylindrical vessel 13. The top of the cylindrical section 23 is open so that material such as phosphate rock and acid may be introduced into the preliminary mixing chamber 9.

A short section 27 of the cylindrical vessel 13 is a common wall to the preliminary mixing chamber 9 and the main reaction vessel 5. An opening 29 is provided in a lower portion of the cylindrical vessel 13 in this section 27 thereby providing a common opening 29 in a lowermost portion of the preliminary mixing chamber and in a lower portion of the main reaction vessel 5. Solid particles and liquid introduced into the preliminary mixing chamber 9 pass through the opening 29 into the main reaction vessel. As shown in FIGURE 2, the edge of the inclined flat plate 25, where it joins the cylindrical vessel 13, meets the lower edge of the opening 29. This feature prevents solid particles from settling to the bottom of the preliminary mixing chamber and remaining therein.

The settling chamber 11, like the preliminary mixing chamber 9, is a section of a substantially vertical cylinder 37 which is suitably attached to the cylindrical vessel 13. The bottom of the cylindrical section 37 is closed with an inclined flat plate 39 which is sloped downwardly toward the cylindrical vessel 13. A short section 41 of the cylindrical vessel 13 is a common wall to the settling chamber 11 and the main reaction vessel 5. An opening 43 is provided in a lower portion of the cylindrical vessel in this section 41, thereby providing a common opening 43 in the lowermost portion of the settling chamber 11 and in a lower portion of the main reaction vessel 5. Solid particles and liquid may pass through this opening 43 from the main reaction vessel 5 into the settling chamber 11. The preliminary mixing chamber 9 and the settling chamber 11 are positioned about 90° apart with respect to the cylindrical vessel 13.

In the settling chamber 11 quiescent conditions are maintained and the solid particles in the liquid settle out and drop down to the bottom 39 of the chamber 11. Since the bottom 39 of the chamber 11 is inclined downward toward the cylindrical vessel 13, solid particles will tend to return to the cylindrical vessel. As shown in FIGURE 3, the lower edge of the inclined flat plate 39 where it joins the cylindrical vessel 13, meets the lower edge of the opening 43. Solid particles on the inclined flat plate 39 may, therefore, freely slide back into the main reaction vessel 5.

A drawoff conduit 45 extends through the bottom inclined wall 39 and terminates within the settling chamber 11, below the level of the lower edge 19 of the opening 17 out of the main reaction vessel 5. The upper portion of this conduit is provided with a stop member or collar 47. A short section of Plexiglas tubing 49, having an inside diameter substantially equal to the outside diameter of the conduit 45 is fitted over the conduit 45 and rests on the collar 47. The length of the tubing 49 is such that when its lower end is resting on the collar 47, the upper end is above the lower edge 19 of the opening 17 out of the main reaction vessel 5. The Plexiglas tubing 49 is provided with a plurality of holes 51 through the walls of the tubing. In an embodiment of the apparatus the holes were 1/16" diameter. Liquid, substantially free of solid particles, passes through the openings 51 and into the drawoff conduit 45.

It is preferred that the upper end of the tube 45 be below the level of the lower edge 19 of the opening 17 in the main reaction vessel 5. With the apparatus operating so that liquid overflows through the opening 17, there is, therefore, a substantially constant head on the liquid flowing out through the outflow conduit 45, which is desirable for some uses of the apparatus.

In a small embodiment of the apparatus, the main reaction vessel 5, was constructed of 1/8" wall Plexiglas, had a 2½" O.D., and was 6" long. The other parts of the apparatus are illustrated in the drawing, substantially to scale. In a use of this apparatus from 5.0 to 10.0 gms. of a predominantly siliceous material containing some phosphate were dropped into the preliminary mixing chamber 9 every 2 minutes. 45 ml./min. of 33% hydrochloric acid were also introduced into the preliminary mixing chamber. 20 ml./min. of liquid and unreacted solid particles overflowed through opening 17, and 25 ml./min. of substantially solid particle free liquid were withdrawn through conduit 45.

The description of the invention utilized specific reference to certain construction details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. An apparatus which comprises in combination a main reaction vessel in fluid communication with two separate chambers, (a) a preliminary mixing chamber having the lowermost portion thereof and a lower portion of said main reaction vessel connected by a first passageway through which solid particles and liquid may flow from said preliminary mixing chamber into said main reaction vessel, the bottom of said preliminary mixing chamber inclined downward toward said main reaction vessel and meeting said main reaction vessel adjacent said first passageway, and (b) a settling chamber having the lowermost portion thereof and a lower portion of said main reaction vessel connected by a second passageway through which solid particles and liquid may flow, the bottom of said chamber being inclined downward toward said main reaction vessel and meeting said main reaction vessel adjacent said second passageway, an opening in an upper portion of said main reaction vessel for withdrawal of solid material from said main reaction vessel, and an outlet in an upper portion of said settling chamber, said outlet positioned below the level of the opening in the upper portion of said main reaction vessel and above the level of said second passageway.

2. An apparatus which comprises in combination a substantially vertical cylindrical main reaction vessel in fluid communication with two separate chambers, (a) a preliminary mixing chamber having the lowermost portion thereof and a lower portion of said main reaction vessel connected by a first passageway through which solid particles and liquid may flow from said preliminary mixing chamber into said main reaction vessel, the bottom of said preliminary mixing chamber inclined down toward said main reaction vessel and meeting said main reaction vessel adjacent said first passageway, and (b) a settling chamber having the lowermost portion thereof and a lower portion of said main reaction vessel connected by a second passageway through which solid particles and liquid may flow, the bottom of said settling chamber inclined down toward said main reaction vessel and meeting said main reaction vessel adjacent said second passageway, an opening in an upper portion of said main reaction vessel for withdrawal of solid material from said main reaction vessel, and an outlet conduit for withdrawal of liquid from said settling chamber, said outlet conduit having the inlet thereof in an upper portion of said settling chamber, said inlet comprising a plurality of openings positioned below the level of the opening in the upper portion of said main reaction vessel and above the level of said second passageway.

References Cited in the file of this patent

UNITED STATES PATENTS

| | | |
|---|---|---|
| 1,297,170 | Holley et al. | Mar. 11, 1919 |
| 2,245,130 | Guillissen | June 10, 1941 |
| 2,647,103 | Griffith et al. | July 28, 1953 |
| 2,698,219 | Martin | Dec. 28, 1954 |
| 2,717,903 | Ruth | Sept. 13, 1955 |